(12) United States Patent
Wright et al.

(10) Patent No.: US 10,574,381 B2
(45) Date of Patent: Feb. 25, 2020

(54) OPTICAL NETWORK DESIGN AND ROUTING

(71) Applicant: British Telecommunications Public Limited Company, London (GB)

(72) Inventors: Paul Wright, London (GB); Andrew Lord, London (GB); Michael Parker, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 15/562,859

(22) PCT Filed: Mar. 29, 2016

(86) PCT No.: PCT/EP2016/056776
§ 371 (c)(1),
(2) Date: Sep. 28, 2017

(87) PCT Pub. No.: WO2016/156300
PCT Pub. Date: Oct. 6, 2016

(65) Prior Publication Data
US 2018/0115384 A1  Apr. 26, 2018

(30) Foreign Application Priority Data

Mar. 30, 2015  (EP) .................................... 15275098

(51) Int. Cl.
*H04J 14/02* (2006.01)
(52) U.S. Cl.
CPC ...... *H04J 14/0267* (2013.01); *H04J 14/0257* (2013.01); *H04J 14/0278* (2013.01)

(58) Field of Classification Search
None
See application file for complete search history.

(56) References Cited

U.S. PATENT DOCUMENTS

| 5,596,722 | A  | 1/1997 | Rahnema |
| 9,654,248 | B2 | 5/2017 | Wright et al. |

(Continued)

FOREIGN PATENT DOCUMENTS

| EP | 2403169 A1 | 6/2010 | |
| EP | 2797247 A1 * | 10/2014 | .......... H04J 14/0241 |

(Continued)

OTHER PUBLICATIONS

Guoying Zhang et al: "Optical traffic grooming in OFDM-based elastic optical networks [Invited]", EEE/OSA Journal of Optical Communications and Networking, IEEE, USA, vol. 4, No. 11, Nov. 1, 2012 (Nov. 1, 2012), pp. B17-B25.*

(Continued)

*Primary Examiner* — David W Lambert
(74) *Attorney, Agent, or Firm* — Patterson Thuente Pedersen, P.A.

(57) ABSTRACT

A method of allocating spectrum to a signal in a wavelength division multiplex network including a plurality of nodes, wherein the spectrum comprises a grid divided into a plurality of slots, including allocating to the signal a slot immediately adjacent to a second slot occupied by a second signal, wherein the signal and the second signal are both addressed to the same destination node, and wherein the slots allocated to the signal and the second signal form a spectrum block.

9 Claims, 3 Drawing Sheets

(56) References Cited

U.S. PATENT DOCUMENTS

| 9,860,012 B2 | 1/2018 | Wright et al. |
|---|---|---|
| 2003/0072052 A1 | 4/2003 | Graves et al. |
| 2004/0153492 A1* | 8/2004 | Cao .................... H04J 14/0212 709/200 |
| 2012/0251117 A1 | 10/2012 | Patel et al. |

FOREIGN PATENT DOCUMENTS

| EP | 2797247 A1 * | 10/2014 |
|---|---|---|
| WO | WO 2014/174234 A1 | 10/2014 |
| WO | WO 2016/156300 A1 | 10/2016 |

OTHER PUBLICATIONS

Zhang NPL "Optical Traffic Grooming in OFDM-Based Elastic Optical Networks [Invited]", Nov. 2012, Optical Society of America, vol. 4, No. 11, pp. 17-25 (Year: 2012).*

Application and Filing Receipt for U.S. Appl. No. 14/786,399, filed Oct. 22, 2015, Inventor(s): Wright et al.
Application and Filing Receipt for U.S. Appl. No. 15/028,530, filed Apr. 11, 2016, Inventor(s): Wright et al.
EP Search Report for corresponding EP Application No. 13250053.9; dated Sep. 30, 2013; 5 pages.
International Preliminary Report on Patentability and Written Opinion for corresponding International Application No. PCT/EP2016/056776; dated Oct. 3, 2017; 7 pages.
International Search Report for corresponding International Application No. PCT/EP2016/056776 dated Jun. 22, 2016; 4 pages.
Gerstel et al.; "Elastic Optical Networking: A New Dawn for the Optical Layer?" IEEE Communications Magazine, vol. 50; Issue: 2, Feb. 9, 2012, pp. 512-520 (9 pages total), ISSN: 0163-6804, DOI: 10.1109/MCOM.2012.6146481.
Fan Zheyu et al.; "Dynamic Multipath Routing with Traffic Grooming in OFDM-Based Elastic Optical Path Networks", Journal of Lightwave Technology, IEEE Service Center, New York, NY, US, vol. 33, No. 1, Jan. 1, 2015, pp. 275-281 (7 pages total), XP011571142, ISSN: 0733-8724, DOI: 10.1109/JLT.2014.2387312.

* cited by examiner

OPTICAL NETWORK DESIGN AND ROUTING

CROSS-REFERENCE TO RELATED APPLICATIONS

The present application is a National Phase entry of PCT Application No. PCT/EP2016/056776, filed on 29 Mar. 2016, which claims priority to EP Patent Application No. 15275098.0, filed on 30 Mar. 2015, which are hereby fully incorporated herein by reference.

TECHNICAL FIELD

This disclosure relates to apparatus, systems and methods relating to optical data transmission and network design and routing, particularly but not exclusively in respect of the design and operation of a telecommunications network by optimizing the use of optical bandwidth resource.

BACKGROUND

The way optical networks are used is undergoing significant change, driven in part by the huge growth of traffic such as multimedia services and by the increased uncertainty in predicting the sources of this traffic due to the ever changing models of content providers over the Internet. Sophisticated modulation schemes for higher bandwidth 100 Gb/s services and beyond are known and come into commercial use in optical networks of large and increasing link and node numbers. A bottleneck to widespread deployment of such schemes is the "fixed" wavelength grid approach specified by the International Telecommunication Union (ITU), in which the relevant optical spectrum range in the C-band is divided into fixed-sized spectrum slots. Such conventional "fixed grid" WDM (wavelength divisional multiplexed) networks work on the concept of a fixed spectrum grid typically with a spacing of typically 50 GHz between channels with 80 to 100 of these channels per fiber. In these networks, an individual signal serving a demand between two nodes in the network has to keep within one of these channels or slots defined by guard bands, as otherwise the signal becomes notched and degraded by the wavelength filters when being split from its neighboring signal. As a result of this restriction, advanced modulation formats allowing up to 100 Gbit/s per 50 GHz channel commercially and up to 200 Gbit/s experimentally, have not to now been usefully deployed in a widespread manner. This is because the spectral widths of such signals are wider than can be accommodated within the 50 GHz fixed grid spacing, so the potential of additional increases in transmission speed cannot be realized.

As used herein, a "slot", "wavelength" or "channel" is defined as a wavelength or a spectrum of wavelengths associated with a certain signal size. A "carrier" carries a "signal" or "demand" in the known fashion. As is also known, a connection between nodes is made by assigning spectral (i.e. wavelength) slots on the optical links comprising the path between source and destination.

A response to the problems posed by the decade-old ITU fixed grid approach is the flexible grid or "flexgrid", which facilitates a developing optical networking paradigm known as EON (elastic optical networking). The EON technologies allow for radically different network design and operation methodologies that can increase the amount of traffic the network can carry compared to conventional WDM networks, but need different processes to make them operate effectively to get the most out of such networks. In the flexgrid approach, the optical spectrum can be divided up flexibly in dependence on requirements, and elastic optical paths (i.e. paths with variable bit rates) can be generated. This allows for operational and functional flexibility in use of both the optical spectrum and transceivers, previously unavailable in fixed grid implementations. In a flexgrid, the spectrum grid is divided into much finer slot widths, typically 12.5 GHz or less, compared to the 50 GHz in the fixed grid approach. Significantly, adjacent channels can be joined together to form arbitrary sized slots to carry signals of a variety of widths, allowing for signals ranging in size from an individual channel to that occupying the entire optical spectrum to be carried.

Figure 1:
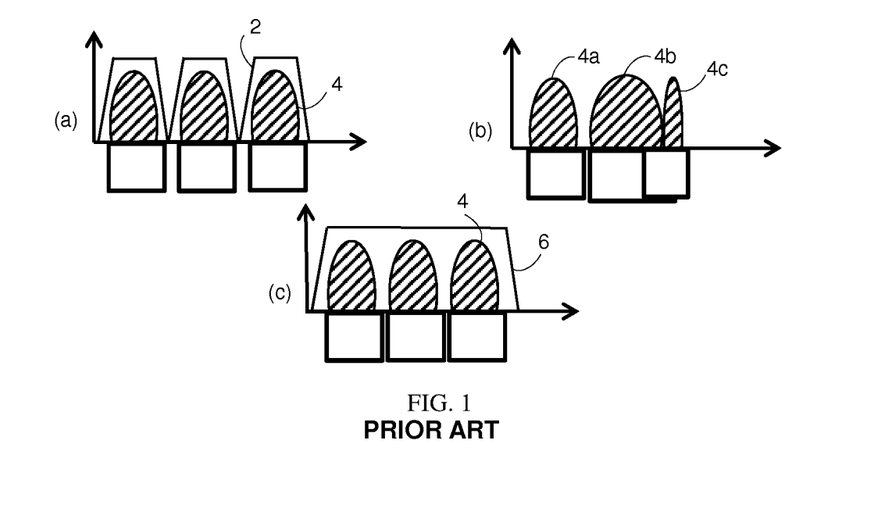
FIG. 1 depicts three graphs depicting known methods of transmitting signals or demands, respectively being (a) the transmission of demands in a fixed grid system, (b) the transmission of demands in a flexgrid system, and (c) the transmission of demands in a superchannel in a flexgrid system.

Representations of signals carried according to the fixed and flexible grid approaches are depicted in graphs shown in FIG. 1, in which graph (a) is a depiction of the fixed grid approach, in which guard bands (2) partition adjoining optical channels (4) occupied by demands or wavelengths at a particular bit rate. The guard bands serve to separate a demand from other demands going to other destinations and to protect the main signal as it passes through filters in the network so as to reduce the effects of passing through the optical nodes. Graph (b) illustrates the flexgrid approach used in an EON network, in which the demands (here shown to be of various spectral widths) are not constrained within a slot of pre-defined spectral size. As illustrated by demand (4b) in graph (b) of FIG. 1, a high bitrate demand with a spectral width exceeding fixed grid slot sizes can be accommodated. A "superchannel" (6) (depicted in graph (c) of FIG. 1) for carrying demands which are too large to be handled by a single optical channel, can similarly be accommodated in an EON network. A superchannel comprises a grouping of multiple channels and is handled as a single entity, traversing the network for demultiplexing at the receiver end. Specifically, they can be produced by a bandwidth variable transponder (BVT) enabling a number of carriers. The carriers are aggregated together at the transceiver to produce an optical signal of a size which depends on the level of traffic carried by the signal. So if more traffic needs to be carried by the BVT, additional carriers can be added and conversely, if traffic levels decrease, carriers can be disabled. A general description of the use of BVTs in an EON network can be found in "Elastic Optical Networking: A New Dawn for the Optical Layer?" by O. Gerstel, M. Jinno, A. Lord, SJB Yoo (IEEE Communications Magazine, February 2012). The operational flexibility of superchannels can usefully cope with growth in traffic levels in a network over time, and significant spectral savings can be gained over the fixed grid approach. BVTs can be used in both fixed grid and flexgrid systems, although they are deployed to greater effect in flexgrid networks owing to the capacity of the latter to accommodate the greater spectral widths of superchannels.

In a conventional WDM network, a node receives signals from one or more other nodes in the network, typically via intermediate nodes. Currently, all these signals meant for the same destination node are each considered in isolation, and known routing techniques such as routing and spectrum assignment (RSA) algorithms allocate a route and spectrum to a signal regardless of its source and destination. As a result, signals originating from different nodes but destined for the same node can be allocated spectrum or blocks of spectrum potentially anywhere across the entire C-Band even on the same link. Even between the same source/destination node pair, multiple signals (caused by the need to carry increasing levels of traffic across the network) are likely to use different parts of the spectrum and possibly different routes across the network. Conversely, signals destined for different nodes can be placed on neighboring or contiguous sections on the optical spectrum along a link or route. Because no filter can be entirely precise, guard bands between demands are essential to provide a kind of "padding" between signals to be split within the spectrum for transmission to different destinations, and also to allow an operational tolerance during the splitting process. Guard bands occupy part of the spectrum alongside the demands they separate, and so as might be expected, the spectral requirements for guard bands increase as the number of discrete signals or number of nodes in the network increases.

It would be desirable for more of the precious spectrum resource to be given to carrying signals or demands instead of being occupied by components such as guard bands. By making better optimized use of existing optical fiber assets by serving the maximum number of customer demands possible on any given fiber link or network, the need to expensively and disruptively install additional fiber and transceivers can be prevented or at least advantageously delayed.

The applicants' co-pending applications WO2014174234 and GB1317987.4 describe a method of routing signals in a WDM network which is based on the level of "network entropy" of an identified route (representing the extent to which a spectrum comprises non-contiguous used or unused sections within it), which are incorporated by reference herein. U.S. Pat. No. 5,596,722 also considers network routing entropy in the context of satellite communication system which is not based on WDM. None of these documents address the issue of saving spectrum for more productive allocation to demands or signals in preference to other components or requirements such as guard bands.

SUMMARY

According to a first aspect of the disclosure, there is provided a method of allocating spectrum to a signal in a wavelength division multiplex network comprising a plurality of nodes, wherein the spectrum comprises a grid divided into a plurality of slots, comprising allocating to the signal a slot immediately adjacent to a second slot occupied by a second signal unseparated by a guard band, wherein the signal and the second signal are both addressed to the same destination node, and wherein the slots allocated to the signal and the second signal form a spectrum block.

In applications of the disclosure, signals are allocated spectrum resources on a link in a way which groups them together in dependence on their destination nodes. This is achieved by placing a new demand into a slot immediately adjacent to another demand which is addressed to the same destination node as the new demand. This can result a row of slots all occupied by signals addressed to the same destination. This allows for the grouping to form a block which can be routed over one or more links through the network as a single unit, doing away with the need for guard bands between the individual signals within the block. As a result, precious spectral capacity can be conserved for use by signals instead. A signal addressed to a destination node which is different from the first is treated as a different unit from the first, and separated from the first block by a guard band for purposes of passing through a filter. The signal bound for another destination can comprise a single slot or a block comprising more than one slot. In a more preferred application, signals which originate and are addressed to the same source and destination nodes are allocated immediately adjacent nodes to each other.

According to a second aspect of the disclosure, there is provided a method for generating a spectrum allocation in a wavelength division multiplex network comprising a plurality of nodes, wherein the optical spectrum comprises a grid divided into a plurality of slots, the plurality of slots being grouped into spectrum blocks, comprising using a spectrum entropy measure indicative of the level of fragmentation of spectrum of each spectrum block in dependence on the destination node of each spectrum allocation, wherein the spectrum entropy measure is calculated based on $$-\sum_{i=1}^{N} \frac{D_i}{D} \ln \frac{D_i}{D}$$

where N is the total number of spectrum blocks in the spectrum, D is the total number of slots, ln is the natural logarithm, and $D_i$ is the number of slots in the $i^{th}$ spectrum block.

In this aspect, a measure of the spectrum entropy of a particular block of signals all destined for the same destination, is calculated to determine how fragmented the spectrum is for that block. Ideally, signals meant for a particular destination are grouped into immediately adjacent slots, especially if they also originate from the source node, so that they are can treated as a single group without need for guard band protection between individual signals. The measure can be calculated for links making up the entire route from source to destination, the entire route, or for the network as a whole. For the purpose of e.g. generating an optimal routing and spectrum assignment configuration e.g. on Day One, a genetic approach can be adopted which is based on the spectrum entropy measure of spectrum blocks.

According to a further aspect of the disclosure, there is provided a network management system module configured to generate a spectrum allocation in a wavelength division multiplex network comprising a plurality of nodes, wherein the optical spectrum comprises a grid divided into a plurality of slots, the plurality of slots being grouped into spectrum blocks, comprising a processor configured to use a spectrum entropy measure obtained by methods of the disclosure.

According to a further aspect of the disclosure, there is provided an optical spectrum arrangement in a wavelength division multiplex network, wherein the spectrum comprises a grid divided into a plurality of slots, comprising: a plurality of spectrum blocks each formed from a plurality of slots, and a guard band separating each spectrum block from each other.

In this aspect, applications can enable an optical spectrum to be arranged into spectrum blocks which are pre-designated for signals to a specific destination, the blocks comprising slots suitable for immediate or later occupation by signals for its designated destination node. The blocks are optimally placed as far from each other as possible at the design stage or Day One, so that more signals can be added to occupy the blocks as necessary as time goes on. The skilled person would appreciate that the distance between blocks can be adjusted on the basis of, e.g., foreknowledge of the traffic levels that might be expected to a particular destination.

BRIEF DESCRIPTION OF THE DRAWINGS

Systems, methods and apparatus embodying the present disclosure will now be described by way of example only, with reference to the following drawings, wherein.

DETAILED DESCRIPTION

Figure 2A:
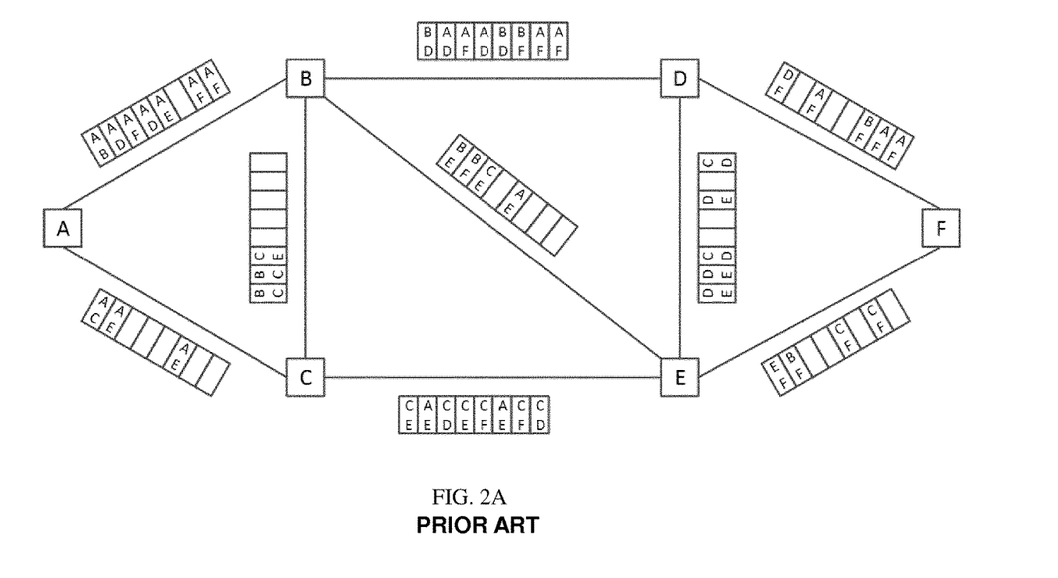
FIG. 2A depicts conventional routing and spectrum allocation in a network.

FIG. 2A shows an exemplary routing and spectrum allocation according to conventional methods for an optical network consisting six nodes (10): nodes A to F. A spectrum resource (12) each comprising eight slots (14) is available on each link (18). The letters in the boxes depicting spectral slots (14) indicate the source and destination of a signal occupying each spectrum slot. So for example, the spectral resource on the link between nodes B and D is occupied by a signal originating from node B and destined for node D in slot 1 (the first from the left in the spectrum block), a signal originating from node A and destined for node D in slot 2, a signal originating from node A and destined for node F in slot 3, and so on. In the conventional approach illustrated in FIG. 2, signals allocated a route and spectrum regardless of its source and destination, and hence it is possible for signals originating from different nodes to be placed in neighboring slots 1 and 2 on the B-D link, as is the case also for signals intended for different destinations which are placed in neighboring spectral slots 2 and 3. Specifically, there is no grouping of destinations meaning that traffic destined for a particular node to be scattered across the spectrum.

This is an inefficient mode of operation for a number of reasons but one main reason is that each signal or spectrum block (of signals addressed to the same destination) requires guard bands on each side. This is illustrated in FIG. 1(a) where guard bands (2) are provided for each individual signal (4). As previously noted, guard bands take up spectral resource which otherwise might be available to carry signals. The more discrete signals there are on an optical link or route, the more spectrum needs to be reserved for guard bands.

Figure 2B:
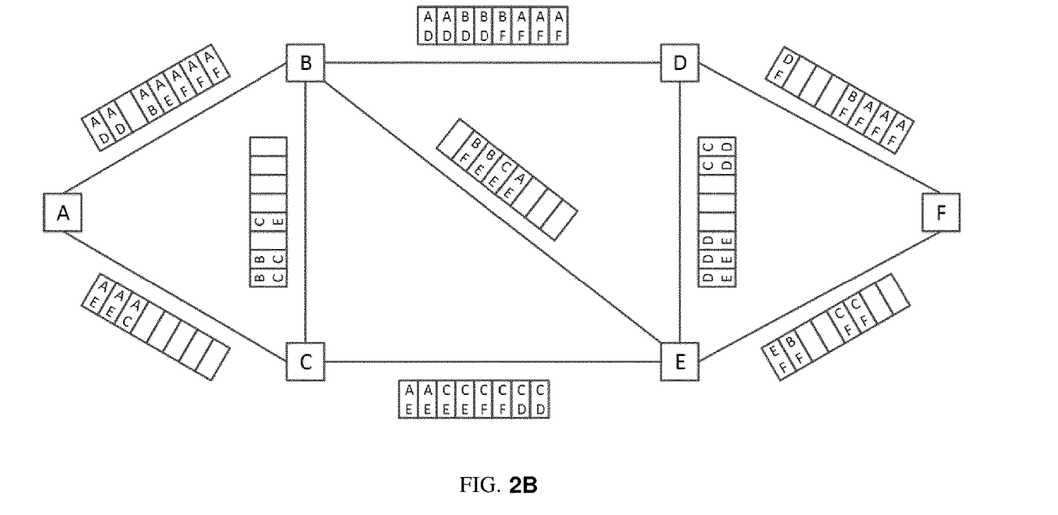
FIG. 2B depicts routing and spectrum allocation according to the disclosure.

In contrast, FIG. 2B depicts how the same network architecture of FIG. 2A can be operated to carry the same traffic according to an application of the disclosure. The spectrum has been allocated to group together signals which share the same origination and destination points. Referring to the A-B link, it will be noted that there are two A-D signals occupying the spectrum block. By "grouping" the two A-D signals together and placing them into neighboring slots 1 and 2 on the A-B and B-D links in the manner shown in FIG. 2B, they can be treated as a single unit all the way as they progress from node A until they reach their destination at node D. This is conceptually similar to how superchannels (depicted in FIG. 1(c) above), in which a number of demands are treated as a single entity for routing through the network.

As noted above, guard bands serve to protect the signals as they pass through the filter when being split to be directed in different directions. In the present example, the signals in slots 1 and 2 are both addressed to the same place, node D, so there is no need to split them at node B (through which they pass on the way to node D). Accordingly, there is no need to employ a guard band between slots 1 and 2, freeing up the spectral resource that would otherwise have been needed. At the destination node D, the received group of signals can be safely separated from each other even in the absence of guard bands, e.g. by power splitting them and then filtering, or by using coherent transceivers which can accurately tune into any particular signal.

Figure 3A:
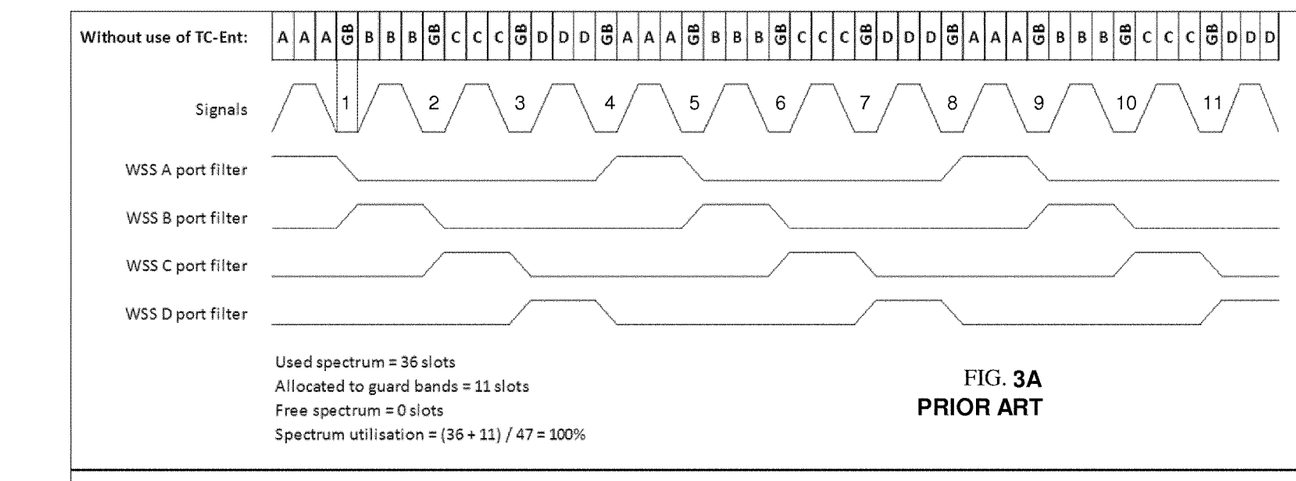
FIG. 3A depicts spectrum use according to conventional methods.
Figure 3B:
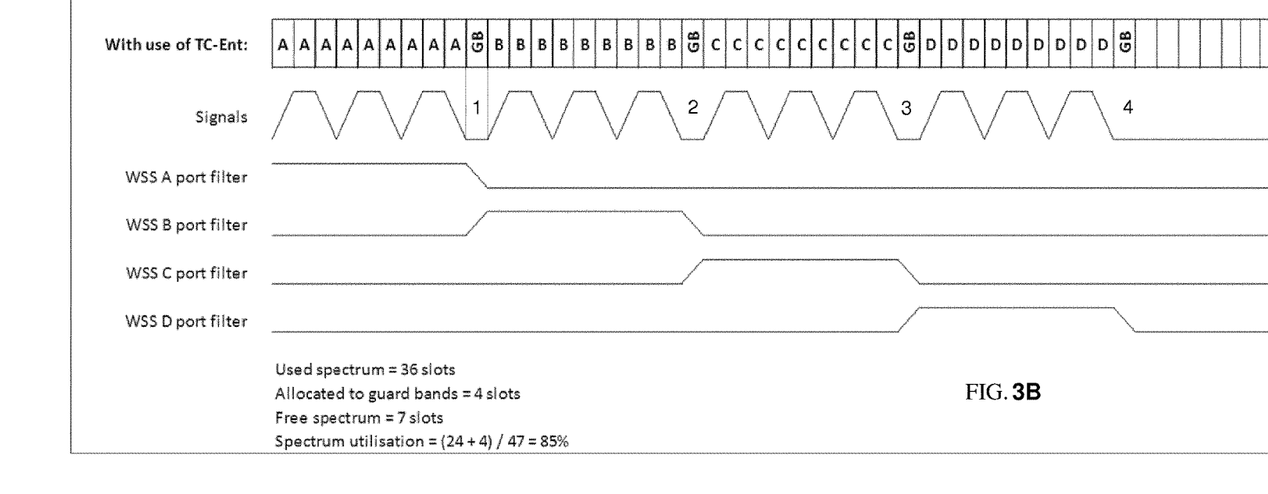
FIG. 3B depicts spectrum use according to the disclosure.

FIGS. 3A and 3B quantifies the possible savings in spectrum (hitherto taken up by guard bands) that can be realized by adoption of methods according to the disclosure. FIGS. 3A and 3B depict a 47-slot spectral resource (12) in a network configuration comprising four nodes (A, B, C and D). In an exemplary scenario, three signals, each requiring three spectrum slots (14), is required to be received at each of the four nodes. The letters in each of the slots represents the destination node, so referring to FIG. 3A for example, slots 1 to 3 represent the signal addressed to node A.

FIG. 3A depicts the result in the case where no deliberate steps are taken to group signals or demands together, e.g. with the deployment of conventional, on-the-fly, allocation techniques. In this example, none of the signals destined for a particular node are located next to each other: it would be appreciated that the random nature in which signals are conventionally allocated spectrum may or may not generate such a configuration. The signal destined for node A which occupies slots 1 to 3 (first three slots on the left) is separated by a guard band ("GB") from the signal bound for node B which occupies slots 5 to 7. For simplicity, the guard band is depicted as occupying a slot's width (here, slot 4), although in general this need not be the case: e.g. if you had an underlying grid resolution of 6.25 GHz, two or more adjacent slots may be needed to form the guard band. As a result, 11 guard bands (1 to 11) are needed in this example to separate 12 signals occupying a total of 36 slots, allowing them to pass through filters at intermediate node points for onward transmission to different parts of the network. All 47 slots are used, 0 slots are left and the spectrum is 100% used. As expected, the number of guard bands needed increases with the randomness of the placement of demands; so if signals destined for e.g. A, B, C, D were placed in contiguous slots in that order, this creates four spectrum blocks requiring three guard bands to separate them from each other. This aspect is central to the concept of the topological complexity entropy of a given path or link, which will be discussed in detail below.

FIG. 3B shows the same signals of FIG. 3A being carried but this time they are deliberately grouped together according to the disclosure, based on their destination node. This time, 36 slots are still required for the transmitted signals but now only 4 slots are required for the guard bands (1 to 4), i.e. one for each destination node. Seven slots are freed up, out of the total spectrum of 47 slots, meaning that the spectrum is only 85% utilized. 15% of the total spectrum resource is available to transmit further signals meaning that the optical resource is better and more efficiently used than without the grouping being made.

FIGS. 3A and 3B also depict the possible profiles for the filters (20) for the four ports from the Wavelength Selective Switch (WSS) that sits within an optical node and routes the traffic for the various output ports. As can be seen in FIG. 3B, in the case of grouped traffic the filter profiles are much simpler with just one opening being made per destination compared with three in the non-grouped case shown in FIG. 3A. This simplifies the configuration of the WSS and other devices and components within the node such as amplifiers. Although frequency management is required in other communication areas (such as wireless and coaxial systems) reduction in the spectrum allocated to the guard bands is not as important as it is in optical network systems and this is due to a number of reasons. In optical systems, the usable spectrum due to attenuation and the operating window of amplification systems is fairly narrow and limited to around 5THz. In other technologies this window is much greater and therefore making use of more guard bands has less impact. In the case of wireless systems, the fact that signals can come from transmitting nodes of varying distance away from the receiving node means that there can be significant differences in received power levels and therefore more advanced filtering systems are required, meaning that additional guard bands are needed.

Figure 4:
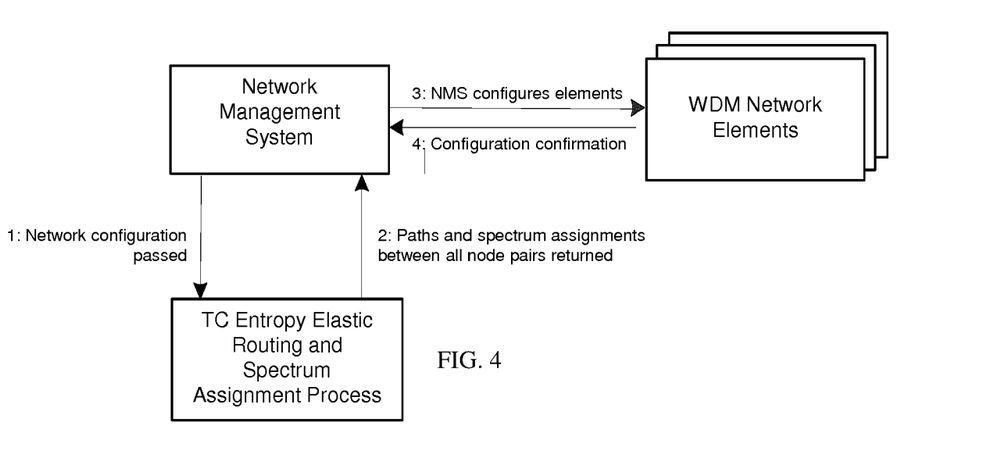
FIG. 4 depicts network components arranged for the assignment of routes and spectrum for signals according to the disclosure.

FIG. 4 depicts a possible network arrangement for the management, control and operation of a network in accordance with the disclosure, which includes a network management system (NMS) (30) that has a current view of the network and instructs the individual network elements to make changes when new customer demands are requested. The process flows between the network components used in routing and allocation management in respect of applications of the disclosure share much in common with that in a conventional set up based on e.g. RSA, which typically comprises the following. The process commences with a request for a connection to be made between a source node and a destination node. This request is sent to the NMS, which seeks and obtains data about the network state. This information is then used to discover a suitable path based on the network state, which according to standard RSA methods would include shortest-path calculations. The identified path is then returned to the NMS. The WDM network elements or transceivers are then configured to place the signal along the path identified for that purpose.

In embodiments of the disclosure, the conventional RSA method is substituted by a process or routine for calculating the topological complexity entropy (TCE) of the path, link, or network as the case may be. "TCE" may be understood as a measure of how fragmented an optical spectrum allocation is, with respect to the destination of each demand. Generally therefore, a spectrum where all demands are grouped together in contiguous slots based on their destination has a lower TCE than a spectrum where all demands are randomly allocated. The skilled person would appreciate that as an alternative to replacement of conventional RSA techniques, the system may include entropy calculations in addition to standard routing decisions, and that both the link- and path-based methods could in appropriate cases allow for deeper analyses of the network and identified routes to be carried out before a decision is taken, to obtain improved or desired outcomes, or to enable compliance with an adopted policy.

One application of the disclosure uses a measure of the level of spectral entropy in an optical link or route to enable the grouping together of signals or demands addressed to the same destination node, with the aim of reduce spectrum wastage. In an embodiment, superchannels consisting of multiple signals destined for the same node are created, which require just one set of guard bands each as depicted in FIG. 1(c). As described above, this also has the effect of simplifying routing operations within a node, thereby reducing the topological complexity of the solution.

In one application, the NMS is configured and operated to obtain a routing and spectrum assignment for each node pair in the network on Day One when the network is first provisioned, such that a given spectrum allocation for signal(s) destined for a specific node is placed as far away from signals intended for other destinations as possible. This allows each signal group the greatest opportunity to "grow" as additional customer demands for the specific destination are received. So referring to FIG. 3B for example, the "B" group signals could be placed several slots distant from the "A" group (using up some of the spare available spectrum), allowing for new demands destined for node A to be included at a later date.

Specifically, the inputs to the process and into the NMS are the number of network nodes, fiber links and a traffic matrix; the output of the process is a routing and spectrum allocation for each node pair. For this process, the route and spectrum assignment for the demand between A and B can be different from the route and spectrum assignment from B to A. The description below is for a genetic algorithm approach, but the desired output could be obtained using any other optimization algorithms such as simulated annealing.

The process starts by defining the encoding for the network configuration in terms of the routing and spectrum assignment by means of a sequence of integers. If the network consists of n nodes, there are n*(n−1) node pairs. For the routing of each of these node pairs, a number of paths through the network (e.g. 32) are computed based on a standard metric such as number of hops or fiber length and the links that are used in each of these paths are stored in memory. For the spectrum assignment the available spectrum is broken into a number of slots and each node pair is assigned an allocation, the size of which is predetermined from the traffic matrix given as an input. Each spectrum assignment is identified by the base slot for its allocation. To encode the whole network configuration for a network of n nodes requires 2*n*(n−1) integers. For each node pair, the currently selected route out of the list of pre-computed ones is recorded along with the base spectrum allocation. These configurations are called network configuration vectors.

The genetic algorithm approach is initialized by randomly creating the first generation of network configurations. This is done by randomly filling in the entries in a large number (typically around 5,000) of network configuration vectors. This set of configuration vectors is known as generation zero. To generate each successive generation, the following process is followed. The first step is to check through each network configuration vector to check it is a valid configuration in that there is no signal overlap on any link in the network. If there is any overlap present, the configuration is ignored. For configurations that contain no overlaps, the network TCE of the configuration is calculated. Obtaining the TCE uses the base formula of $$H = -\sum_{i=1}^{N} \frac{D_i}{D} \ln \frac{D_i}{D}$$

to calculate the entropy for a particular link where there are N blocks of spectrum destined for the same node, $D_i$ is the number of slots in the current block and D is the total number of slots in the entire spectrum band. Any unused spectrum can be considered part of adjacent blocks of used spectrum, but this is not compulsory. To calculate the TCE for the entire network, this is repeated for every link in the network and the entropies summed together.

Figure 5:
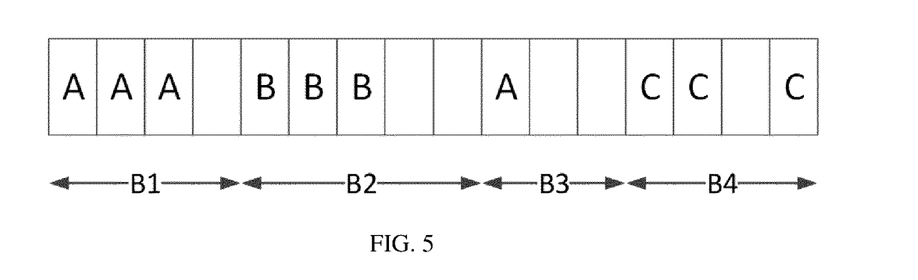
FIG. 5 depicts a spectrum map comprising blocks of used and unused slots.

Referring to the spectrum (12) depicted in FIG. 5 as an example, this comprises a total of 16 slots (14), of which 10 slots are used (identified by the letter of the node they are destined for), and six are unused. The TCE can be calculated by first identifying four separate blocks of spectrum. The first block (B1) consists of four slots, three of which are destined for node A and one is unused. The second block (B2) consists of five slots, three destined to node B and two slots unused. The third block (B3) contains one slot destined for node A again and two unused slots. This third block is considered separately from the first block (B1) as even though both blocks are destined to node A as they are not contiguous and are separated by the block (B2) of spectrum for node B. The fourth and final block (B4) contains three slots destined for node C and one slot unused. As the unused slot is contained within slots destined for node C this unused slot can be considered part of the larger block.

The calculation would be:

$$H = -\sum_{i=1}^{N} \frac{D_i}{D} \ln \frac{D_i}{D} = -\left(\frac{4}{16}\ln\frac{4}{16} + \frac{5}{16}\ln\frac{5}{16} + \frac{3}{16}\ln\frac{3}{16} + \frac{4}{16}\ln\frac{4}{16}\right) = 1.371$$

The network TCE calculation is used to quantify how optimal a solution is (in terms of how "grouped together" the signals are). A smaller value from the result of this calculation indicates that the network configuration shows a greater degree of signal group based on the destination node. The process for calculating the network TCE is shown in pseudo code extract shown in Listing 1 below.

Listing 1: Pseudo code for calculating network topological complexity entropy

```
1: CalcNetworkTCEntropy(NetworkConfiguration)
2:     NetworkTCEntropy = 0
3:
4:     For Each Link in NetworkConfiguration
5:         TotalSlots = count of number of spectrum slots in Link
6:         LinkEntropy = 0
```

Listing 1: Pseudo code for calculating network topological complexity entropy

```
7:
8:         For Each Spectrum Block Destined for the Same Node in
           LinkSpectrum
9:             BlockSlots = count of number of slots in
               Current Block
10:            LinkEntropy = LinkEntropy + BlockSlots /
           TotalSlots * ln(BlockSlots / TotalSlots)
11:        Next Block
12:
13:        NetworkTCEntropy = NetworkTCEntropy +
               Entropy
14:    Next Link
15:
16:    Return - NetworkTCEntropy
```

Once the network TCE is calculated for each of the configurations within a generation the configurations that show a better solution with an entropy below a certain value (such as above the average entropy for the generation) can be "bred" together. This means that good solutions are either spliced together at a random point in the network configuration vector (so a proportion of the new configuration comes from one candidate and the rest comes from another candidate), or a single value in the vector can be mutated to a new value chosen at random. Whether to splice or mutate can be chosen at random. The next generation, again typically containing a large number of candidates, is therefore generated taking the better traits from the previous generation. Successive generations continue to be generated until the time that the average network Shannon entropy of a number of successive generations is no longer increasing or some other threshold defined by the network operator (such as a certain percentage of the maximum network entropy) is reached.

The "best" network configuration (defined as being the one with the smallest network topological complexity entropy) in the final generation is then selected as the solution to the problem and this is used as an input by the NMS uses this to configure the network nodes and for allocating future demands.

A full pseudo code extract for the process is shown in Listing 2.

Listing 2: Pseudo code for entire TCE network design process using genetic algorithms

```
1: TCEntropyRoutingAndSpectrumAssignment(Network)
2:     NumberOfPaths = 32              # Number of paths to calculate per node pair
3:     SpectrumSize = 8000             # Number of slots in spectrum
4:     GenerationSize = 5000           # Number of configurations in each generation
5:     GenerationThreshold = 0.9 * MAXENT  # Threshold for ideal situation (90% of Maximum Entropy)
6:
7:     # Determine the pre-computed routes for all node pairs in the network
8:     Foreach Unique Node Pair
9:         PathTable += CalculateRoutesThroughNetwork(Source, Dest,
       NumberOfPaths)
10:    Next Unique Node Pair
11:
12:    # Create Generation Zero
13:    For n = 0 to GenerationSize
14:        Foreach Unique Node Pair
15:            Path = GetRandomNumber(1, NumberOfPaths)
16:            Spectrum = GetRandomNumber(1, SpectrumSize)
17:            ConfigurationVector(n) += <Path, Spectrum>
18:        Next Unique Node Pair
19:    Next n
20:
```

Listing 2: Pseudo code for entire TCE network design process using genetic algorithms

```
21:     GenerationEntropyAverage = 0
22:
23:         # Generate and Evaluate Generations
24:         While GenerationEntropyAverage > GenerationThreshold
25:             GenerationEntropySum = 0        # Used to calculate generation average Entropy
26:             GenerationEntropyCount = 0
27:
28:             LowestEntropyConfiguration = null  # Used to determine highest Entropy solution
29:             LowestEntropyValue = 0             # in current generation
30:
31:         For n = 0 to GenerationSize
32:                 # Check whether current configuration vector is valid (i.e. no overlaps)
33:                 IsValid(n) = ValidateConfiguration(ConfigurationVector(n))
34:
35:             If IsValid(n) is True Then
36:                 # Calculate the Network Entropy of the current configuration
37:                 NetworkEntropy(n) = CalcNetworkTCEntropy(ConfigurationVector(n))
38:
39:                 # Add to average entropy count
40:                 GenerationEntropySum = GenerationEntropySum + NetworkEntropy(n)
41:                 GenerationEntropyCount = GenerationEntropyCount + 1
42:
43:                 # Check whether this is the best configuration of this generation
44:                 If NetworkEntropy < LowestEntropyValue Then
45:                     LowestEntropyConfiguration = ConfigurationVector(n)
46:                     LowestEntropyValue = NetworkEntropy(n)
47:                 End If
48:             End If
49:         Next n
50:
51:             # Calculate average entropy for the Generation
52:             GenerationEntropyAverage = GenerationEntropySum / GenerationEntropyCount
53:
54:             # Breed the next generation between those configurations which are below the average network
55:             # entropy
56:             NextGeneration = BreedNextGeneration(ConfigurationVector, IsValid, NetworkEntropy,
57:                 GenerationEntropyAverage)
58:
59:             # Make the next generation the current generation
60:             ConfigurationVector = NextGeneration
61:         Loop
62:
63:         # Return the configuration with the highest network entropy
64:         Return LowestEntropyConfiguration
```

The above is centered on the TCE of each optical spectrum allocation of a signal, which as noted above is defined in terms of the destination node of the particular signal. An optimal routing and spectrum assignment result following the above is a configuration in which the signals or grouped within a block so that the spectrum entropy measure within the block is minimized, while each block (being populated with signals all destined for the same node) is placed as far apart as possible from each other, allowing for new signals for that destination node to be added over time and as the network grows. The aspect of placing blocks as far apart as possible, while not key to the central idea of grouping signals addressed to the same destination, is nonetheless a preferred way of designing the network especially on Day One to provide scope for growth.

The apparatus, methods and configurations described above and in the drawings are for ease of description only and not meant to restrict the scope of the disclosure to any particular embodiment. For example, it will be apparent to the skilled person that steps can be added or omitted from the methods and processes described herein. While the examples illustrating application of the disclosure are made in respect of an optical network and in particular in connection with flexgrid-based systems, it would be appreciated that other telecommunications systems as well as non-telecommunications systems can suffer from resource fragmentation as well during use, which could benefit from an analysis of entropy levels. In particular, the approach of grouping signals based on their destinations (and secondarily, on their sources) into blocks to treat them as a single entity for routing can also be applied in scenarios to select a preferred path and wavelength channel or slot more optimally than those which allocate spectrum in the current, random, manner. In particular, entropy based fragmentation RSA techniques as described herein can be adopted into existing methods with little significant component reconfiguration owing to the ease with which algorithms along the lines of the above can be loaded into existing systems. It would also be appreciated that techniques and applications of the disclosure can also be advantageously applied in a variety of situations, not being restricted to use only in respect of identifying network routes, to increase in network capacity by maximizing spectral efficiency.

The invention claimed is:

1. A method of allocating spectrum to a signal in a wavelength division multiplex network comprising a plurality of nodes, wherein the spectrum comprises a grid divided into a plurality of slots, the method comprising:
    allocating to the signal a slot immediately adjacent to a second slot occupied by a second signal unseparated by a guard band, wherein the signal and the second signal are both addressed to a same destination node, and wherein the slots allocated to the signal and the second signal form a spectrum block,
    wherein a third signal addressed to a second different destination node is allocated a third slot separated by a guard band from the spectrum block, and
    wherein all of the signals in the spectrum block having a same destination node are grouped to be adjacent irrespective of a source node of the signals.

2. A method according to claim 1, wherein allocation of spectrum to the third slot results in at least one unallocated slot separating the spectrum block from the third slot.

3. A method according to claim 1, wherein signals originating from a same source node and addressed to the same destination node are allocated slots immediately adjacent to each other.

4. A method for generating a spectrum allocation in a wavelength division multiplex network comprising a plurality of nodes, wherein the optical spectrum comprises a grid divided into a plurality of slots, the plurality of slots being grouped into spectrum blocks, the method comprising:
    using a spectrum entropy measure indicative of a level of fragmentation of spectrum of each spectrum block in dependence on a destination node of each spectrum allocation, wherein the spectrum entropy measure is calculated based on $$-\sum_{i=1}^{N} \frac{D_i}{D} \ln \frac{D_i}{D}$$

where N is a total number of spectrum blocks in the spectrum, D is a total number of slots, ln is the natural logarithm, and $D_i$ is a number of slots in the $i^{th}$ spectrum block,
    wherein the spectrum allocation has a plurality of source nodes, and wherein all signals in each spectrum block having a same destination node are grouped to be adjacent irrespective of a source node of the signals.

5. A method according to claim 4, wherein a spectrum entropy measure is iteratively calculated for a succession of generations of signal routes in the form of spectrum allocations for node pairs comprising a source node and a destination node.

6. A method according to claim 5, wherein the iterative calculation of the spectrum entropy measure terminates either upon determination that a spectrum entropy measure obtained for a generation of signal routes is less than a spectrum entropy measure for a previous generation of signal routes, or upon the spectrum entropy measure obtained for a generation of signal routes meeting a predefined numeric threshold.

7. A network management system module configured to generate a spectrum allocation in a wavelength division multiplex network comprising a plurality of nodes, wherein the optical spectrum comprises a grid divided into a plurality of slots, the plurality of slots being grouped into spectrum blocks, the network management system module comprising:
    a processor configured to use a spectrum entropy measure obtained by using a spectrum entropy measure indicative of a level of fragmentation of spectrum of each spectrum block in dependence on a destination node of each spectrum allocation, wherein the spectrum entropy measure is calculated based on $$-\sum_{i=1}^{N} \frac{D_i}{D} \ln \frac{D_i}{D}$$

where N is a total number of spectrum blocks in the spectrum, D is a total number of slots, ln is the natural logarithm, and $D_i$ is a number of slots in the $i^{th}$ spectrum block,
    wherein the spectrum allocation has a plurality of source nodes, and wherein all signals in each spectrum block having a same destination node are grouped to be adjacent irrespective of a source node of the signals.

8. A system comprising:
    at least one processor and memory configured to implement an optical spectrum arrangement in a wavelength division multiplex network, the wavelength division multiplex network comprising a plurality of nodes, wherein the spectrum comprises a grid divided into a plurality of slots, the optical spectrum arrangement comprising:
    a plurality of spectrum blocks formed from a plurality of slots, wherein the slots that form a block are unseparated by a guard band,
    and a guard band separating each spectrum block from each other,
    wherein at least one of the slots of one of the plurality of spectrum blocks is allocated to a signal,
    wherein a slot immediately adjacent to the least one of the slots is occupied by a second signal,
    wherein the signal and the second signal are both addressed to a destination node,
    wherein all of the signals in a respective spectrum block having a same destination node are grouped to be adjacent irrespective of a source node of the signals, and
    wherein at least one of the slots of a second one of the plurality of the spectrum blocks is allocated to a signal addressed to a second destination node.

9. The system according to claim 8, wherein each spectrum block comprises at least one unallocated slot.

* * * * *